United States Patent [19]
Oka et al.

[11] Patent Number: 5,830,603
[45] Date of Patent: Nov. 3, 1998

[54] SEPARATOR FILM FOR A STORAGE BATTERY

[75] Inventors: Yoshio Oka; Takafumi Uemiya; Takeshi Sakamoto; Akira Harada, all of Osaka, Japan

[73] Assignee: Sumitomo Electric Industries, Ltd., Osaka, Japan

[21] Appl. No.: 785,881

[22] Filed: Jan. 21, 1997

Related U.S. Application Data

[63] Continuation of Ser. No. 299,509, Sep. 1, 1994, abandoned.

[30] Foreign Application Priority Data

| Sep. 3, 1993 | [JP] | Japan | 5-219443 |
| Oct. 14, 1993 | [JP] | Japan | 5-257174 |
| Oct. 14, 1993 | [JP] | Japan | 5-257175 |
| Oct. 14, 1993 | [JP] | Japan | 5-257361 |
| Feb. 4, 1994 | [JP] | Japan | 6-012635 |

[51] Int. Cl.$^6$ .................................................. H01M 2/16
[52] U.S. Cl. ........................ 429/249; 429/254; 204/296
[58] Field of Search ................ 204/296; 429/249, 429/254

[56] References Cited

U.S. PATENT DOCUMENTS

| 5,094,895 | 3/1992 | Branca et al. | 428/36.91 |
| 5,100,723 | 3/1992 | Iwasaki et al. | 429/249 |
| 5,591,542 | 1/1997 | Sakamoto et al. | 429/249 |

FOREIGN PATENT DOCUMENTS

| 51-18991 | 6/1976 | Japan . |
| 61-78053 | 4/1986 | Japan . |
| 0180401 | 3/1989 | Japan . |
| 64-86445 | 3/1989 | Japan . |
| 2-229552 | 8/1992 | Japan . |
| 4-286863 | 10/1992 | Japan . |
| 2081604 | 2/1982 | United Kingdom . |

*Primary Examiner*—Bruce F. Bell
*Attorney, Agent, or Firm*—W. G. Fasse; W. F. Fasse

[57] ABSTRACT

A separator film for a battery is formed as a hydrophilized porous biaxially oriented film. The porous biaxially oriented film has a porosity of at least about 70%, a thickness in the range of about 10 to about 500 $\mu$m, and a pore size in the range of about 0.01 to about 20 $\mu$m. The porous film is made of hydrophobic resin, and a hydrophilic high polymer which is fixed in the pores of the film. The hydrophilic high polymer may be heterogeneously distributed in the porous film, so that the separator film has a hydrophilic portion and a hydrophobic portion. The porosity and/or the pore size of the porous film can be varied in the direction of film thickness. The separator film is applied in an alkaline storage battery or a nonaqueous electrolyte battery such as a lithium battery.

27 Claims, 8 Drawing Sheets

SEPARATOR FILM FOR A STORAGE BATTERY

This application is a continuation of U.S. application Ser. No.: 08/299,509; filed on.: Sep. 1, 1994, now abandoned.

FIELD OF THE INVENTION

The present invention relates to a separator film for a storage battery such as an alkaline storage battery. Alkaline storage batteries include for example nickel-cadmium batteries, or nickel-hydrogen batteries.

BACKGROUND INFORMATION

Storage batteries employed for various power sources include battery and alkaline storage batteries and a nonaqueous electrolyte batteries. A high reliability can be expected for the former, which can be reduced in size and weight. On the other hand, the latter can attain a high electromotive force and a high energy density, since a light metal or light metal ions can be employed. Due to their high performance, these storage batteries are applied to various portable devices, and can also be suitably used as batteries for electromobiles.

Between an anode active material (reductant) and a cathode active material (oxidant) of a chemical battery, an electrolyte which is an ion conductor and a separator film for preventing direct contact of the materials is interposed. Further, a stable metal or carbon is employed as a conductive material or a collector, in order to improve the conductivity on both electrodes. These battery elements are enclosed in a housing, to form the battery.

An alkaline storage battery separator film has been prepared from woven or nonwoven fabric of polyamide fiber, or a mixture of the same and a film of cellophane or polyvinyl alcohol. In recent years, such a separator film has been prepared from woven or nonwoven fabric which is made of polyolefin fiber such as polypropylene, in consideration of the alkali resistance of the polyolefin and oxidation resistance.

In the alkaline storage battery, however, the separator film prepared from woven or nonwoven fabric of polyamide fiber has an inferior alkali resistance and oxidation resistance. For example, nonwoven fabric of nylon may be decomposed in the battery. Such decomposition generates carbonic acid gas and ammonia, leading to an increase in internal pressure in the battery and has a bad influence on the battery characteristics. On the other hand, woven or nonwoven fabric which is made of polyolefin such as polypropylene has an inferior wettability and electrolyte holdability. Further, the nonwoven fabric has such a large pore size that a cathode and an anode may be short-circuited due to an increased porosity. In such a conventional separator, it may be necessary to reduce the porosity which undesirably reduces the ion permeability to some extent, in order to prevent short-circuit between cathode and anode. In that case, the internal resistance of the battery is increased with a deterioration of the battery characteristics related to quick charging and discharging, in particular.

In order to improve the ability to hold the electrolyte polyolefin, it is possible to treat the polyolefin with fuming sulfuric acid or concentrated sulfuric acid for introducing hydrophilic groups into the same. However, this process disadvantageously leads to alteration of the polyolefin. Further, the number of hydrophilic groups such as sulfonic acid groups which can be introduced through this process is so limited that it is difficult to attain a sufficient electrolyte holdability.

Japanese Patent Publication Laying-Open No. 4-286863 (1992) discloses a preparation of an alkaline battery separator film from a substance which is obtained by providing fluororesin such as polytetrafluoroethylene having a porous structure and a with hydrophilicity. This publication discloses a method of treating a surface of fluororesin with a plasma, for providing the same with hydrophilicity. However, the number of hydrophilic groups which can be introduced into the resin by plasma treatment is so limited that the electrolyte holdability of a fluororesin separator film cannot reach a sufficient level by plasma treatment. Further, it is desirable to improve the gas permeability of such a fluororesin separator.

On the other hand, a nonaqueous electrolyte battery employing a light metal such as lithium or sodium as an anode active material is widely employed in various fields of electric and electronic devices, cameras and the like. In particular, a lithium battery employing lithium as an anode active material is used as an excellent battery having a high energy density. Such a nonaqueous electrolyte battery has recently been improved in its capacity and output, with a substantial enlargement of its application range. Thus, higher characteristics are increasingly required for this battery. However, the nonaqueous electrolyte battery is restricted with regard to quick charging and discharging due to ionic conductivity of the electrolyte which is inferior to that of an aqueous battery. Improvement of such characteristics are needed. For example, a battery for a portable telephone must be charged in a short time, while that for an electromobile must be discharged with a high current in starting or while driving uphill.

Japanese Patent Publication Laying-Open No. 61-78053 (1986) discloses the preparation of a separator film from polypropylene nonwoven fabric which is treated with a microwave plasma, for the purpose of improving the discharging characteristics of a nonaqueous electrolyte battery by improving the affinity and wettability of the separator film with respect to the electrolyte. According to this publication, the polypropylene nonwoven fabric is irradiated with a microwave of 13.56 kHz, for example. On the other hand, Japanese Patent Publication Laying-Open No. 64-86445 (1989) discloses an electrochemical apparatus employing a polyolefinic microporous film which is surface-treated by plasma irradiation to form a separator. Due to the plasma irradiation treatment, functional groups such as carbonyl groups or carboxyl groups are formed on the separator film surface to improve the affinity of the separator film to the electrolyte.

However, the nonwoven fabric employed in the nonaqueous electrolyte battery also has a large pore size, similarly to that of a separator film for an alkaline storage battery. A separator film which is prepared from nonwoven fabric must be reduced in its porosity and increased in thickness thereby, however, sacrificing the ion permeability to some extent, in order to prevent a short-circuit between the cathode and anode. Therefore, a battery employing a nonwoven fabric inevitably has an increased internal resistivity. In the plasma treatment attention must be paid to the fact that groups having an affinity to the electrolyte cannot be introduced in a large amount, and that the material strength is reduced by the treatment. When a miniature battery is assembled and the active materials repeat expansion and contraction while charging or discharging, stress is applied to the separator film in the battery. The separator film must have sufficient strength against such stress. Further, the separator film must reliably prevent a short-circuit between the cathode and anode, while holding a sufficient amount of electrolyte and permeating a sufficient amount of ions. In consideration of ion permeability, the separator film is preferably reduced in thickness and improved in porosity. Such a separator film for a battery must have the following characteristics:

(a) excellent ion permeability;

(b) resistance against alkali;

(c) resistance against oxidation;

(d) resistance against heat;

(e) sufficient strength against stress;

(f) capability of sufficiently holding the electrolyte; and (g) quick gas permeability for reducing gaseous oxygen which is generated in the battery in an overcharged state.

However, the above requirements cannot be sufficiently satisfied by the prior art. In general, it is particularly difficult to effectively improve the electrolyte holdability (f) and the gas permeability (g) among these requirements.

SUMMARY OF THE INVENTION

It is an object of the present invention to provide a separator film for a battery, which can satisfy the aforementioned requirements.

Another object of the present invention is to provide a separator film for a battery, which can advantageously permit a quick charging or discharging and provide a storage battery having a long battery life.

Still another object of the present invention is to provide a separator film for a battery, which is excellent in both of electrolyte holdability and gas permeability.

According to the invention an alkaline storage battery has a separator film between its anode and cathode wherein the separator film comprises a porous oriented film consisting essentially of hydrophobic resin having pores therein, and one or more hydrophilic polymers fixed in said pores of said porous film, a heterogeneous distribution of said hydrophilic polymer or polymers in said pores of said film, said heterogeneous distribution forming in said separator film a first film portion having a first hydrophilicity caused by said hydrophilic polymer or polymers and a second film portion having one of a hydrophobicity and a second hydrophilicity that is lower than said first hydrophilicity of said first film portion, and wherein said separator film has a gas permeability.

According to the invention an alkaline storage battery has as separator film between its anode and cathode wherein the separator film comprises a porous oriented film consisting essentially of hydrophobic resin having pores therein, and one or more hydrophilic polymers fixed in said pores of said porous film, wherein said pores of said porous film comprises pore sizes that vary in the thickness direction of said separator film, and wherein said separator film has a gas permeability.

According to the invention alkaline storage battery has a separator film between its anode and cathode wherein the separator film comprises a porous resin film consisting essentially of hydrophilized hydrophobic resin and pores in said porous resin film, said porous resin film having porosities that vary in the thickness direction of said porous resin film, and wherein said separator film has a gas permeability.

According to one embodiment of the present invention, a separator film for a battery comprises a hydrophilized porous biaxially oriented film. The term "biaxially oriented film" indicates a film having a network structure which is obtained by biaxial orientation in a draw forming operation.

The hydrophilized porous biaxial oriented film can preferably have a porosity of at least about 70%, a thickness in a range of about 10 to about 500 $\mu$m, and a pore size in a range of about 0.01 to about 20 $\mu$m.

According to another embodiment of the present invention, a separator film for a battery comprises a porous film consisting essentially of hydrophobic resin, and one or more types of hydrophilic polymers which are fixed or held in pores of the porous film. The hydrophobic resin can preferably be prepared from fluororesin. The hydrophilic polymer(s) can preferably include at least one type of high polymers selected from the group consisting of a high polymer containing hydroxyl groups, a high polymer containing carboxyl groups, a high polymer containing imine and a high polymer containing sulfonic acid groups.

According to still another embodiment of the present invention, the present separator film for a battery comprises a porous resin film which has pores of varying pore diameter in the direction of film thickness. In this separator film, at least one of a pair of opposite major surfaces of the porous resin film can have pores with a smaller pore size than the pore size in the interior of the film. In the present context, the phrase "a pair of opposite major surfaces of the porous resin film" means the front and back surfaces of the film when the porous resin film is a sheet of resin film.

According to a further feature of the present invention, the present separator film for a battery comprises a porous resin film which has a porosity that varies in the direction of film thickness.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
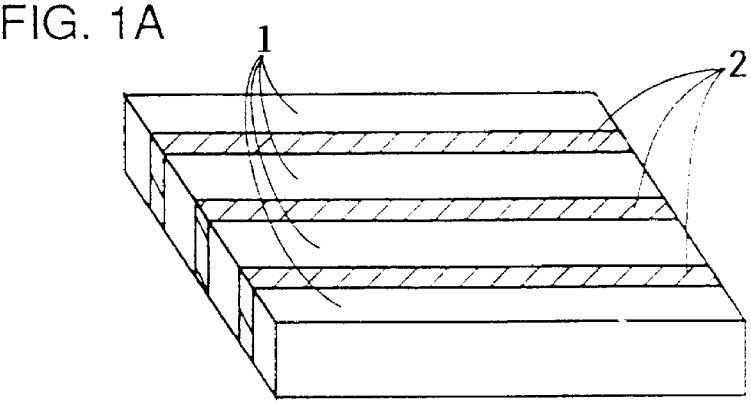
FIGS. 1A, 1B, 1C and 1D are perspective views showing typical examples of different separator film structures according to the present invention.

In order to improve the quick charging and discharging characteristics of a battery, it is generally important to reduce the internal resistance of the battery. In order to reduce the internal resistance of the battery, it is necessary to make the separator film hold a larger amount of electrolyte. Due to using a biaxially oriented film, it is possible to obtain the following characteristics, which have been impossible to obtain in a nonwoven fabric nor in a uniaxially oriented film: First, it is possible to reduce the pore size of the separator film, thereby reliably preventing particles of cathode and anode active materials from passing through the separator film. When the active materials are prepared from particles of about 20 to 100 $\mu$m, a separator film which has pores of not more than 20 $\mu$m in pore size prevents the cathode and anode from short-circuiting, and contributes to prevention of dropping of the active materials in the battery. In a nonaqueous electrolyte battery, it is expected to be possible by controlling the pore size to prevent a short-circuit between the cathode and an anode. Such short-circuit could be caused by metallic lithium which is deposited during quick charging or overcharging if the pores in the separator film are too large. The present separator film improves the battery safety and the battery life. The lower limit of the pore size depends on the type of the battery. Second, the separator film has sufficient strength so that the same is not uniaxially torn. A uniaxially oriented film has such an inferior tensile strength that the film is easily torn along its vertical direction, although the same has sufficient tensile strength along the direction of orientation. On the other hand, a biaxially oriented film can substantially uniformly maintain sufficient tensile strength in both directions. Therefore, the separator film is not torn to cause a short circuit between the cathode and anode by a volume change due to an expansion or contraction of the active materials caused during assembling of the battery or while charging or discharging the battery. Third, the film can be reduced in thickness, which is not possible with a nonwoven fabric separator. Each of alkaline and nonaqueous electrolyte batteries must contain large amounts of active materials in a limited space of its housing, to improve the energy density and capacity of the battery. Thus, the separator film is preferably minimized in thickness. In a network biaxially oriented film, it is possible to reduce the thickness to about 10 to about 500 $\mu$m. Fourth, it is possible to improve the porosity of the separator film, since the biaxially oriented film can be reduced in pore size and has no possibility of tearing or cause an internal short-circuit. When the porosity is improved, it is possible to hold a larger amount of electrolyte. If the film is reduced in thickness for improving the energy density and capacity, a high porosity is still desired for holding the electrolyte. Thus, the internal resistance is reduced, and it is possible to provide a battery having excellent quick charging and discharging characteristics.

The separator film according to the present invention has preferably a porosity of at least about 70%. As the porosity is increased, it is possible to hold a larger amount of electrolyte whereby the ion conductivity is improved which in turn reduces the internal resistance thereby improving the quick charging and discharging characteristics. If the porosity exceeds about 95%, however, the porous film is so reduced in strength that the film is no longer usable for practical purposes. Therefore, the porosity of the porous film is preferably about 80 to about 95%, more preferably about 90 to about 95%. The porosity can be obtained as follows:

Porosity=Pore Volume to Film Volume×100%

The separator film according to the present invention has pores with pore sizes that are preferably within the range of about 0.01 to about 20 $\mu$m. A porous film with a pore size in this range has an excellent ion permeability. If the pore size is not more than about 0.01 $\mu$m, the internal resistance is so increased during quick charging that the voltage is more quickly increased to reach a decomposition voltage for the electrolyte. The time for reaching the decomposition voltage for the electrolyte is increased as the pore size is increased, and quick charging characteristics are improved as the time is increased. This time is not remarkably changed but substantially remains constant when the pore size exceeds about 0.01 $\mu$m. Namely, the film has remarkably excellent quick charging characteristics if the pores in the film has a pore size of at least about 0.01 $\mu$m. If the pore size exceeds about 20 $\mu$m, however, the cathode and anode active materials easily pass through the separator film.

The separator film preferably has a thickness of about 10 to about 500 $\mu$m. If the film thickness is less than about 10 $\mu$m particularly in a nonaqueous electrolyte battery, the ion conductivity of the nonaqueous electrolyte is reduced and the internal resistance is increased during quick charging due to an insufficient electrolyte holding. Therefore, during charging the battery voltage is quickly increased to reach the decomposition voltage for the electrolyte. The time for reaching the decomposition voltage for the electrolyte is increased as the thickness is increased, and quick charging characteristics of the film are improved as the time is increased, as described above. This time is not remarkably changed but substantially remains constant when the film thickness is in excess of about 10 $\mu$m. Namely, the film has excellent quick charging characteristics to withstand by quick charging or discharging with a current density of at least about 3 mA/cm$^2$, if the film thickness is in excess of about 10 $\mu$m. However, a film thickness exceeding about 500 $\mu$m is not preferred for a separator film for a miniature battery since such a thick film interferes with the battery miniaturization.

The present separator film for a battery is hydrophilized to improve its ability for holding the electrolyte. In this case, the separator film can preferably include a porous film which is made of hydrophobic resin, and one or more hydrophilic polymers which are fixed or held in the pores of the porous film. The hydrophobic resin forming the porous film is preferably prepared from polyolefin such as polyethylene or polypropylene, or fluororesin. The porous film can be formed of woven or nonwoven fabric, or of an oriented film. A biaxially oriented film is particularly preferable for the porous film, as described above. The fluororesin can be prepared from a polymer such as polytetrafluoroethylene (PTFE), polyvinylidene fluoride, polyvinyl fluoride or polychlorotrifluoroethylene, or a copolymer such as a copolymer of tetrafluoroethylene and vinylidene fluoride, a perfluoroethylene propylene copolymer, or a copolymer of perfluoroalkylether and tetrafluoroethylene. According to the present invention, the term "hydrophobic porous resin film" refers to a film having a volume in its interior between its front and back surfaces with a matrix of hydrophobic resin that has open pores forming passages through the front and back surfaces and through the volume of the film, excluding a film having only closed bubbles. A vinylidene fluoride polymer or a copolymer thereof is soluble in a specific solvent, whereby having a porosity of at least 60% is obtained in a method similar to that of preparing a cellulose ester film, by combining the same with a third nonsolvent. As described in Japanese Patent Publication No. 42-13560 (1967) or No. 51-18991 (1976), for example, it is possible to obtain a porous body with a porosity of at least 60%, preferably at least 90% having such a three-dimensional network structure that fibrous bodies are integrally connected with each other, by at least uniaxially, preferably biaxially orienting polytetrafluoroethylene at a temperature below its crystal melting point and then heating the same to a temperature exceeding the crystal melting point in the oriented state. The porous film of fluororesin or the like has preferably a porosity of at least about 70% in order to ensure sufficient electrolyte holdability and gas permeability. In order to prevent the cathode and anode to form a short-circuit, the average size of the pores in the porous film is preferably not more than about 50 $\mu$m, more preferably not more than about 20 $\mu$m, and further preferably not more than about 10 $\mu$m. It is conceivable that the lower limit of the pore size is mainly determined by the amount of oxygen generated from the cathode. However, the amount of oxygen depends on the size of the current during charging or discharging, which is influenced by the battery temperature, the battery size, performance of the active materials and the like. The guide line must be that the average pore size is set so that particles of materials forming the electrodes in the battery, will not pass through the porous film.

According to the present invention, the hydrophilic polymer to be fixed or held in the porous film is preferably prepared from a water-soluble polymer. The water-soluble polymer can be prepared from a high polymer (polymer or copolymer) containing hydroxyl groups such as polyvinyl alcohol, polyethylene glycol, methyl cellulose, ethyl cellulose, hydroxyethyl cellulose or hydroxypropyl cellulose, a high polymer (polymer or copolymer) containing carboxyl groups such as polyacrylic acid or polymethacrylic acid, a high polymer (polymer or copolymer) containing nitrogen such as polyacrylamide, polyvinylpyrrolidone, polyvinylamine or polyethyleneimine, a high polymer (polymer or copolymer) containing sulfonic acid groups such as sulfonate polystyrene or Nafion (registered trademark), or a combination thereof. For example, polyvinyl alcohol or polyethyleneimine can be prepared from a commercial starting material, which is stable in quality with regard to the degree of polymerization etc. The water-soluble polymer is held fixed in the porous film, as a material for suppressing water, the repellency of the hydrophobic porous resin film and providing hydrophilicity. For this purpose, an aqueous solution of the water-soluble polymer is first prepared for impregnating the hydrophobic resin porous film with the aqueous solution whereby the high polymer is introduced into the porous space or pores of the film. Then, a cross-linking treatment is carried out in order to immobilize the water-soluble polymer in the porous film. Such immobilization can be achieved by a heat treatment, by acetalization, by esterification, by chemical reaction with potassium dichromate, or by cross-linking caused by an ionizing radiation such as an electron beam or gamma rays. Immobilization may be further achieved by using a cross-linking agent such as benzoyl peroxide, diazoaminobenzene, azochloroamide, azobisisobutyronitrile, a halogen compound, formaldehyde, thiourea or isocyanate. In order to homogeneously distribute the water-soluble polymer in the interior of the porous film, impregnation and drying can be repeated a plurality of times by using a dilute aqueous solution for impregnation, for example, thereby increasing the concentration of the water-soluble polymer in the internal space. When the porous film has pores of a small pore size, the porous film is first dipped in ethanol, methanol, acetone or an aqueous solution of a surface active agent and then dipped in water so that the water is held in the porous space. Thereafter, the porous film is dipped in an aqueous solution of the water-soluble polymer, so that the high polymer can be efficiently introduced and fixed to the film. The immobilized or fixed polymer is chemically bonded to the surface of the hydrophobic porous resin film. Thus, it is possible to increase the molecular weight and immobilize the polymer by cross-linking of the polymer itself. The immobilized polymer is entangled with the hydrophobic resin porous film. Sufficiently to cover the surface of the porous film structure. It is also possible to fix the hydrophilic polymer in the porous hydrophobic film by dissolving the hydrophilic polymer in a solvent incapable of dissolving the hydrophobic resin of the porous film but capable of dissolving the hydrophilic polymer, dipping the hydrophobic porous resin film in the solution and thereafter drying the film. The hydrophilic polymer is preferably prepared from a copolymer of ethylene and vinyl alcohol, for example. It is also possible to introduce sulfone groups into the hydrophilic polymer.

In a gastight alkaline storage battery, on the other hand, oxygen is generated at its cathode during quick charging, for example. Therefore, the separator film must have a gaseous oxygen permeability, in order to prevent an increase of the internal pressure caused by the generated oxygen. Studies made by the inventors have shown that it is possible to improve the gaseous oxygen permeability of the separator film by partially providing no hydrophilic polymer, i.e. not completely hydrophilizing the initially hydrophobic separator film but leaving a hydrophobic part.

In a preferred mode of the present invention, the distribution of the hydrophilic polymer is heterogeneous in the porous film, whereby the porous film that was itself hydrophobic initially comprises a first portion having a hydrophilicity and a second portion which is lower in hydrophilicity than the first portion or having a hydrophobicity. The first portion can contain a larger amount of the hydrophilic polymer than the second portion. The second portion need not contain any hydrophilic polymer. The property of the second portion is strongly influenced by the hydrophobic resin forming the porous film, while that of the first portion is strongly influenced by the hydrophilic polymer.

FIGS. 1A to 1D show examples of separator films provided with such portions.

For example, the first portions 1 have a first hydrophilicity and the second portions 2 have a second hydrophilicity that is lower than the first hydrophilicity. The second portions 2 may even have a hydrophobicity based on the hydrophobicity of the resin of which the film is initially made. It is not critical which portion is referred to as first and which portion is referred to as second provided that these portions have the just described different hydrophilicities or one portion has a hydrophilicity while the other portion has a hydrophobicity or vice versa.

Figure 1B:
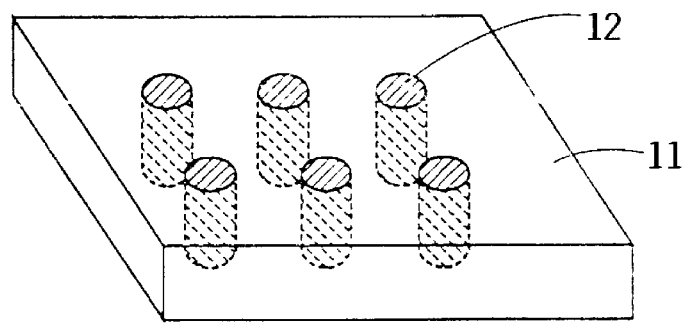

The different portions may have different configurations. For example, the portions 1 and 2 in FIG. 1A are stripes, while the different portions in FIG. 1B are spots or dots 11 on the one hand and the remaining film portions 12 on the other hand. The characteristics described above for portions 1 and 2 in FIG. 1A apply respectively to portions 11 and 12 in FIG. 1B.

In order to form each of the aforementioned patterns such as stripes or dots, a porous hydrophobic film may be impregnated with a hydrophilic polymer solution whereby the porous film is covered with a mask having the desired pattern and then irradiated with an electron beam or the like to cause the cross-linking and fixing, for example. According to this method, it is possible to selectively fix the hydrophilic polymer to the portions irradiated with the electron beam in accordance with the marking pattern. The polymer remaining in the portions not irradiated may be dissolved.

Figure 1C:
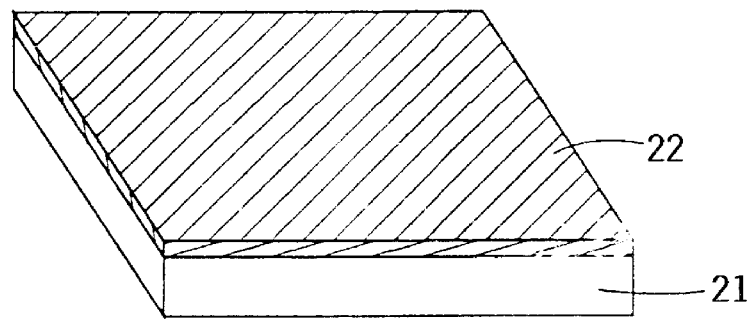

As shown in FIG. 1C, it is also possible to provide a hydrophobic film with two portions 21 and 22. The portion 21 surface extends on one major surface of the other film portion 22. The portion 21 is hydrophobic or has a lower hydrophilicity than the portion 22 or vice versa depending on the treatment or non-treatment with a hydrophilic polymer as disclosed herein. When such a separator film is used in an Ni—Cd battery or an Ni—MH battery, the hydrophobic surface is preferably brought into contact with the Ni pole. When it is difficult to heterogeneously distribute the hydrophilic polymer in a single porous film, a plurality of separate porous film plies may be so prepared that degrees of hydrophilicity and hydrophobicity are varied in some of the film plies. For example, hydrophilic polymers can be fixed to the respective film plies in different amounts and the film plies are then stacked or layered. A film ply having a sufficient hydrophilicity can be laminated to a film ply having a lower hydrophilicity or being hydrophobic. The latter film plies can contain no hydrophilic groups or small amounts of or hydrophilic groups.

Figure 1D:
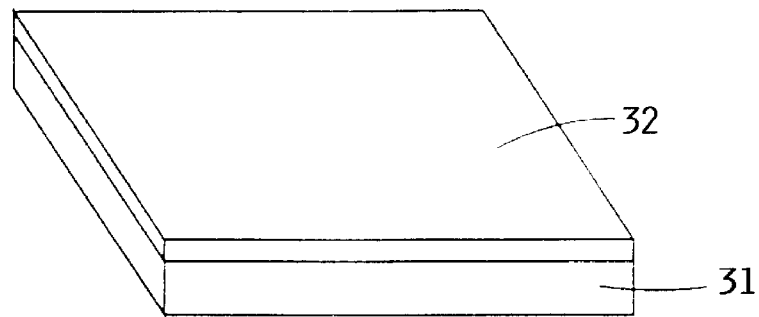

FIG. 1D shows an example of a separator film which is formed by superposing a hydrophobic film ply 31 and a hydrophilic film ply 32. These film ply may have the aforementioned compositions. The structure obtained by superposing such film plies provide an effect which is equivalent to that of a single film having only one hydrophobic surface, as shown in FIG. 1C. The permeability of the separator film for gaseous oxygen is further improved by the portion having low hydrophilicity or being hydrophobic.

In another method of forming the pattern shown in FIG. 1A, a mask provided with a plurality of 6 mm wide slits spaced at intervals of 8 mm, for example, is placed on a porous hydrophobic resin film and a hydrophilic polymer solution for example a 1% aqueous polyvinyl alcohol, is applied through the mask and then the film is dried for forming strip-shaped hydrophilic portions therein. The hydrophilic polymer solution also infiltrates into the porous film and spreads along its surface. Hence, it is possible to adjust the widths of the portions having a low hydrophilicity or being hydrophobic, by arbitrarily setting the widths of portions between adjacent slits of the mask and by controlling the viscosity of the hydrophilic polymer solution. The viscosity can be controlled by the concentration or by the temperature of the solution, for example.

In another method of forming the pattern shown in FIG. 1B, it is possible to employ a mask provided with a plurality of circular or hexagonal holes of an arbitrary initial diameter for forming hydrophilic portions. The dot-shaped portions may have a low hydrophilicity or be hydrophobic while the remaining film portions, due to treatment may have a higher hydrophilicity than said low hydrophilicity or vice versa. While the inner surfaces of the holes are covered with the hydrophilic polymer the hole diameter is reduced to 80 to 85% compared to the initial hole diameter, for example. Due to the aforementioned formation of the pattern with a 1% aqueous polyvinyl alcohol, for example, it is possible to maintain the gas permeability of the entire separator film while improving its electrolyte holding ability by the entire high electrolyte holding ability of the hydrophilic portions.

In another method of forming the film portions 21, 22 having different hydrophilic or hydrophobic characteristics as shown in FIG. 1C, it is possible to apply and infiltrate a hydrophilic polymer solution having a prescribed viscosity by setting of the concentration or controlling the temperature, for example, to one surface of the porous film and drying the film before the solution reaches the other surface, thereby manufacturing the separator film having the structure shown in FIG. 1C. Alternatively, the solution can be applied in the form of a mist and the thickness of the hydrophilic portion 22 or ply is controlled by limiting the mist, application time, whereby the thickness of the hydrophilic portion 22 of the separator film can be finely controlled.

In the separator film according to the present invention, the porous film which consists essentially of hydrophobic resin has high strength, chemical resistance and heat resistance. By fixing the hydrophilic polymer to the porous film it is possible to introduce a larger amount of hydrophilic groups as compared to the treatment of polyolefin with concentrated sulfuric acid or compared to the treatment of fluorine resin with a plasma. Thus, the separator film according to the present invention is superior to the prior art in its electrolyte holding ability. In a battery employing the present separator film, the electrolyte contained in the separator film is inhibited from being absorbed by a Cd electrode in an Ni—Cd battery or a hydrogen absorbing alloy electrode in an Ni-hydrogen battery, whereby the life of the battery is increased. According to the present invention, the hydrophobic resin film is provided with sufficient hydrophilicity and it has an excellent mechanical strength, chemical resistance, and heat resistance. Particularly fluororesin has an excellent chemical stability and oxidation resistance, for example, against an alkali. Fluororesin also has an excellent heat resistance with no thermoplasticity up to 240° C. It is possible to obtain a porous film of fluororesin, particularly a biaxial oriented film, having an excellent morphology through the aforementioned process. When the maximum pore size of the porous film is made smaller than particles formed from the electrodes, the cathode and anode are prevented from forming a short-circuit. When a water-soluble polymer is fixed in the pores of the fluororesin porous film, this film is provided with hydrophilicity. In this case, the film is hydrophilized with no damage to its chemical stability and heat resistance of the fluororesin itself. If fluororesin is hydrophilized by a plasma treatment or corona charging according to the prior art, its chemical stability and heat resistance are disadvantageously reduced. It is to be noted in particular that the present separator film is superior in gas permeability to a conventional separator film which is hydrophilized by plasma treatment, as clearly understood from the following Examples. Although the reason for such improvement of the gas permeability is not yet clarified, a battery having the separator film which is hydrophilized according to the present invention can effectively suppress an increase in an internal pressure caused by gas generation in a final stage of charging, as compared with a battery having a conventional separator film. In the separator film according to the present invention, further, it is possible to correctly adjust the concentration of the water-soluble polymer which is held in the pores of the film, thereby controlling the hydrophilicity and electrolyte holding ability in response to battery conditions. In addition, it is also possible to control the characteristics of the separator film such as the electrolyte holding ability based on the type of the water-soluble polymer and the degree of immobilization, whereby battery conditions can be taken into account. Thus, according to the present invention, it is possible to provide a battery comprising a separator film having proper characteristics with due regard to the materials serving as a cathode and an anode and the electrolyte of the battery.

In a preferred mode of the present invention, the separator film can include a porous resin film which has pore sizes that vary in the direction of its thickness. According to the present invention, it is possible to vary the pore size or the porosity of the porous film in the direction of its thickness, in response to the material of the film, the type of the electrolyte, the film thickness and the like. In a preferred mode of such variation, it is possible to reduce the pore size along at least one surface portion of a pair of opposite major surfaces of the porous film, so that pores near the film surface are smaller than that in the interior of the film.

Figure 2:
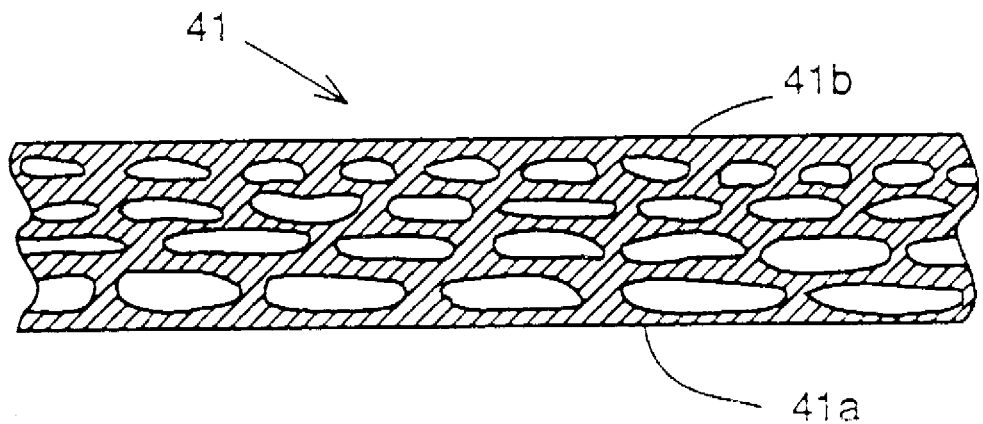
FIG. 2 is a sectional view showing a further example of the present separator film, which has smaller size pores along one major surface of a pair of major surfaces.
Figure 3:
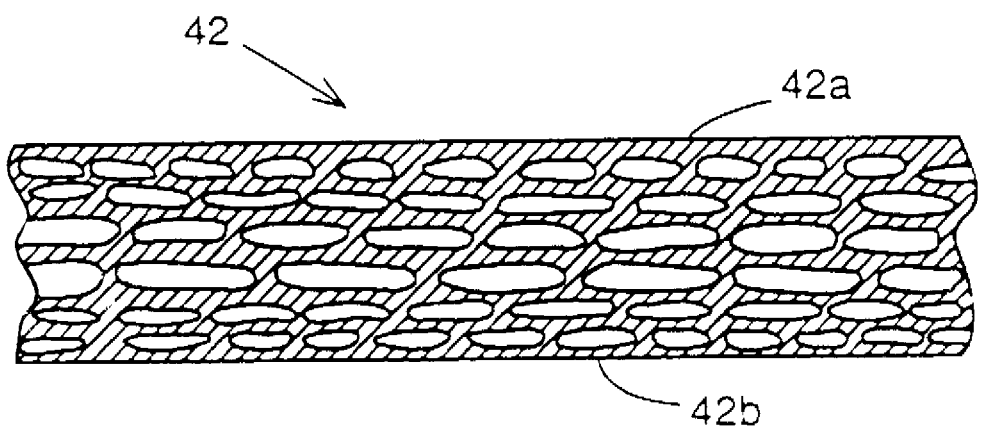
FIG. 3 is a sectional view showing a further example of the present separator film, having a pair of major surfaces with pores of smaller size along these major surfaces compared to the pore size in the interior of the film.

FIG. 2 shows an example wherein that the pore size is reduced only along one major surfaces of the film. FIG. 3 shows an example wherein the pore size is reduced along each major surface of the film.

In a porous film 41 shown in FIG. 2, the pore size is gradually reduced from one major surface 41a toward the other major surface 41b. In such a film, it is possible to increase the porosity of the portion having a larger pore size.

In a porous film 42 shown in FIG. 3, on the other hand, the interior has larger pore sizes than the areas along both major surfaces 42a and 42b. In such a structure, it is possible to increase the porosity of the interior as compared with that along the surfaces. While distribution of the pore size or of the porosity is varied with the aforementioned conditions, it is possible to set the maximum pore size of the porous film at about 50 to 150 μm to an excellent oxygen permeability on the cathode side, while setting the minimum pore size to be not more than about 20 μm for improving the ability to hold electrolyte on the anode side. The porosity is preferably at least about 70% in the overall film volume in consideration of the ability to hold the electrolyte. Yet, is possible to partially increase the porosity, for example to about 85% of volume portion, which is in contact with the cathode, requiring oxygen permeability. Such variation of the pore size can be attained by changing the conditions for preparing the porous film such as extrusion conditions for the raw material resin, and the rolling and drawing conditions. Smaller pores near the surface of the film than in the interior of the film are provided by forming a porous structure by drawing and thereafter heating the surface of the film more than the interior. If it is difficult to carry out such a method, a plurality of film plies which have different pore sizes or different porosities can be superposed or stacked.

Figure 4:
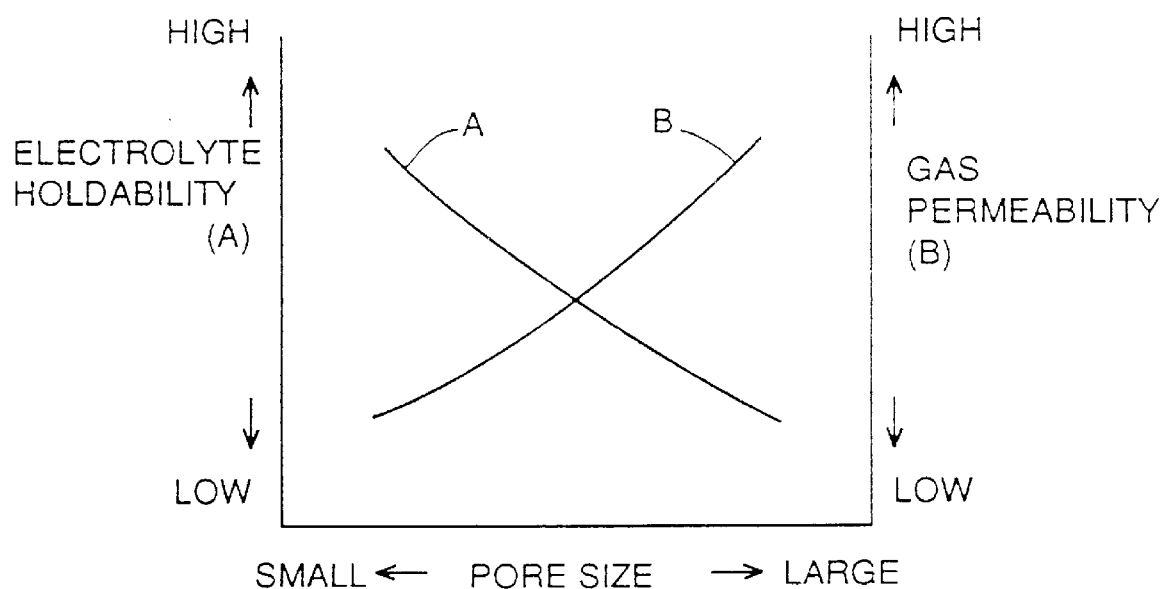
FIG. 4 is a graph showing the relation between the gas permeability and the electrolyte holdability as a function of the pore size in a separator film having a constant porosity.

For example, the inventors have found that in a separator film having a constant porosity in its thickness direction there is a relationship between the gas permeability and electrolyte holding ability as shown in FIG. 4. As shown in FIG. 4, the pore size must be increased in order to improve the gas permeability while the same must be reduced in order to improve the electrolyte holding ability in a certain range of the pore size. Even if a sufficient electrolyte holding ability can be attained in a certain pore size, the gas permeability may be frequently insufficient. It has been to be difficult to sufficiently improve both characteristics in a film having a uniform pore size. The inventor have formed a separator film with portions having larger and smaller pore sizes for the gas permeability in the former and improving the electrolyte holdability in the latter, thereby sufficiently satisfying both characteristics. The portion having a smaller pore size prevents the electrode materials from causing a short-circuit and improves the electrolyte holding ability, while the causing having a larger pore size remarkably improves the gas permeability so that a space charged with the electrolyte can be increased. If the amount of the electrolyte which can be introduced into the portion having a larger pore size, is increased, the thickness of the separator film can be reduced. When the pore size is reduced along each surface as shown in FIG. 3, the electrolyte once introduced into the separator film is hardly discharged out of the film due to the small pore size along each surface. Namely, the electrolyte holdability is improved in this case. When it is possible to increase the amount of electrolyte per constant volume, the separator film can prescribe functions with a small thickness. The amount of active materials in the battery can be increased by employing a thin separator film. Since the portion having a smaller pore size has a high electrolyte holdability, it is preferable to provide the separator film for forming the battery so that the portion having a smaller pore size is in contact with a Cd electrode or an MH electrode absorbing water following a charging or discharging reaction. On the other hand, the electrolyte holding ability can be improved by the hydrophilic portion while maintaining the gas permeability of the overall separator film by varying or adjusting the distribution of the hydrophilic groups, as hereinabove described. Thus, the present invention provides a separator film for a battery having both a desired gas permeability and an electrolyte holding ability, by adjusting the pore size and/or porosity in the direction of the thickness of the film while adjusting the distribution of the hydrophilic groups as needed.

The separator film according to the present invention can be applied to an alkaline storage battery such as an Ni—Cd battery or an Ni-hydrogen battery, or a nonaqueous electrolyte battery such as a lithium battery, a lithium ion battery, a polymer battery or a sodium battery. An anode active material for an alkaline storage battery is generally prepared from cadmium, zinc, iron or hydrogen. The cathode is generally prepared from nickel, while an air electrode or a silver oxide electrode is also partially employed. Due to the change from a pocket type battery to a sintered one, characteristics of the storage battery are improved and the battery is made sealable, leading to an increase in the possibilities for using the battery. In addition to the sintered battery, a foam type battery of high capacity and a felt type battery are put into practice. Anodes of these batteries are prepared from cadmium hydroxide, a hydrogen absorbing alloy and the like. An anode of a nonaqueous electrolyte battery is prepared from a light metal such as lithium, sodium or aluminum. Such a metal is employed as a pure metal or in a state absorbed by or intercalated in a carbon material. A cathode is prepared from a lithium transition metal composite oxide such as $LiCoO_2$, a metal compound such as $MnO_2$ or $MoS_2$, or a polymer such as polyaniline. An electrolyte is prepared by dissolving lithium salt such as $LiBF_4$ or $LiPF_6$ in a simple or mixed solvent of propylene carbonate, ethylene carbonate or 1,2-dimethoxyethane. A cathode material for a lithium battery is prepared from carbon fluoride, a metal oxide such as manganese dioxide, copper oxide or vanadium pentoxide, a metal sulfide such as titanium disulfide, molybdenum disulfide or CuS, a metal selenide such as NbSe or $VSe_2$, a halide such as $CuCl_2$, or a polymer such as polyacetylene, polyaniline or polybenzene. The reaction at the cathode varies with the active material used in the cathode, for example $LiCoO_2$ has a layer structure and lithium infiltrates into portions between the layers in a discharging process (intercalation), for example. When manganese dioxide is employed as the cathode active material, Li$^+$ ions infiltrate into and diffuse in the crystal lattice of manganese dioxide. An anode material for a lithium battery is prepared from a lithium metal, a lithium alloy or a carbon material utilizing absorption or intercalation of Li$^+$ ions, Fe$_2$O$_3$ or WO$_3$. The discharging reaction at the anode is a dissolution by Li$^+$ ionization of the lithium. Since lithium reacts with water, the lithium battery generally employs a nonaqueous electrolyte prepared by dissolving soluble lithium salt such as LiClO$_4$, LiBF$_4$ or LiPF$_6$ in an organic solvent. Examples of such a nonaqueous electrolyte include an electrolyte prepared by dissolving LiBF$_4$ in γ-butyrolactone and an electrolyte prepared by dissolving LiClO$_4$ in a mixed solvent of propylene carbonate and 1,2-dimethoxyethane.

EXAMPLES

In each of the following Examples, the physical properties were measured as follows:

Porosity was obtained from specific gravity (apparent specific gravity) of a film in water and that of the film material, such as PTFE, in accordance with ASTM-D-792. The gas permeability is improved as this value is increased.

An average pore size was calculated by obtaining pore size distribution in accordance with ASTM-F-316-80.

Example 1

An amount of 230 g of white oil serving as a liquid lubricant was added to 1000 g of PTFE fine powder F-104 (400 to 5,000,000 in molecular weight) sold by Daikin Industries, Ltd., and these materials were homogeneously mixed with each other, pressurized and preformed under a pressure of 50 kg/cm$^2$ and thereafter extruded by a paste extruder. The extruded paste was form rolled into a sheet of having a thickness of 0.3 mm. This sheet was dipped in trichloroethylene, so that the liquid lubricant was extracted and removed. Then, the sample was drawn by 500% in a uniaxial direction (longitudinal direction) and by 500% in the direction of width by a roll drawer which was heated to 150° C. The drawn sheet was introduced into a heating furnace, and sintered by heating at about 500° C. for 1 minute.

A sample having a porosity of 80%, an average pore size of 5 μm and a thickness of 40 μm was prepared in the aforementioned manner and dipped in an aqueous solution containing 0.5% of polyvinyl alcohol (Kuraray Povar PVA-217 sold by Kuraray Co., Ltd., having an average degree of 1750 of polymerization and 88 mole % as a degree of saponification). Then, the porous film impregnated with the aqueous polyvinyl alcohol was irradiated with an electron beam of 6 Mrad so that the polyvinyl alcohol was immobilized, thereby forming a hydrophilic resin layer. The so prepared film was employed as separator films in a battery shown in FIG. 5.

Figure 5:
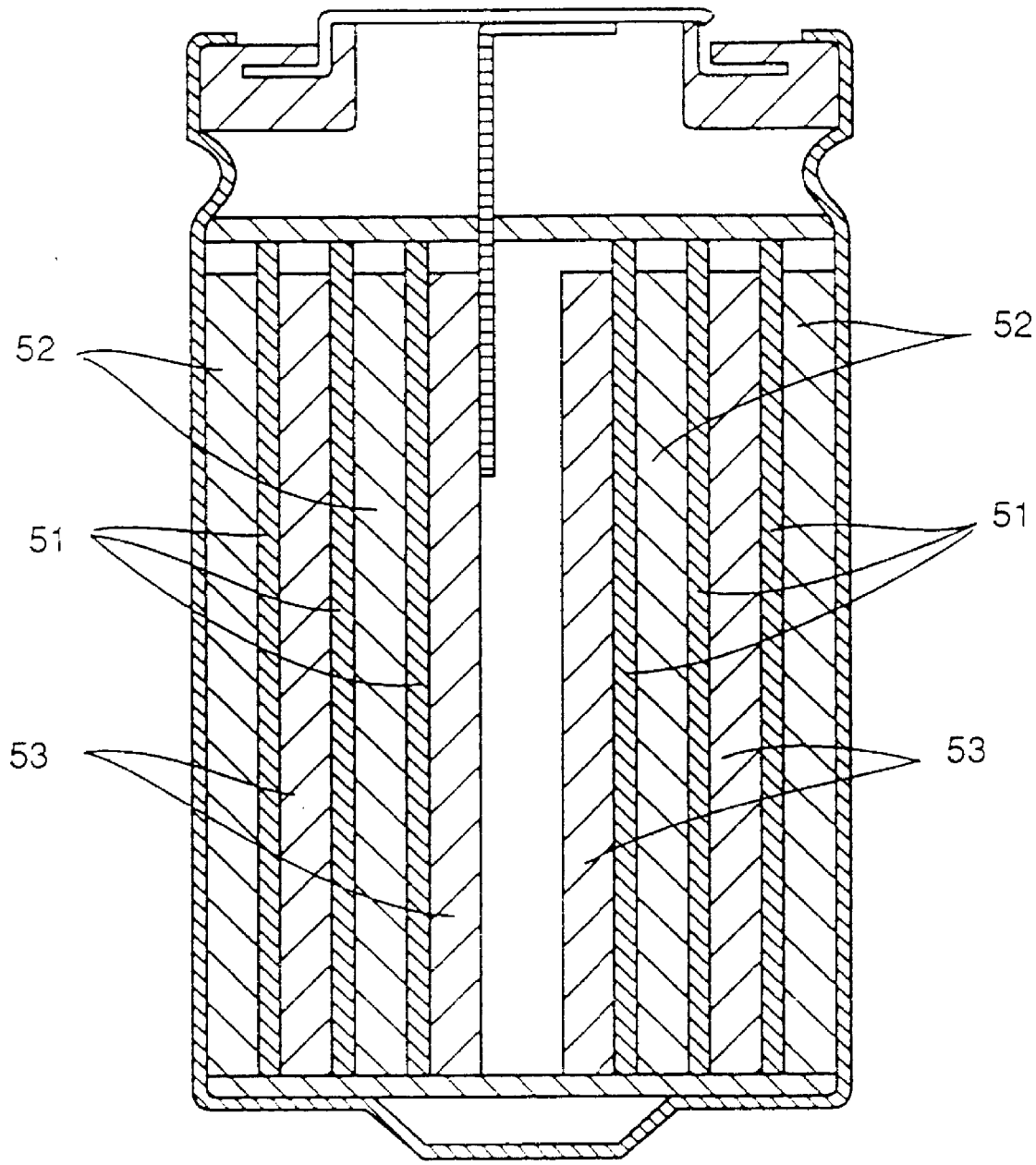
FIG. 5 is a longitudinal sectional view showing an example of a nonaqueous electrolyte battery.
Figure 6:
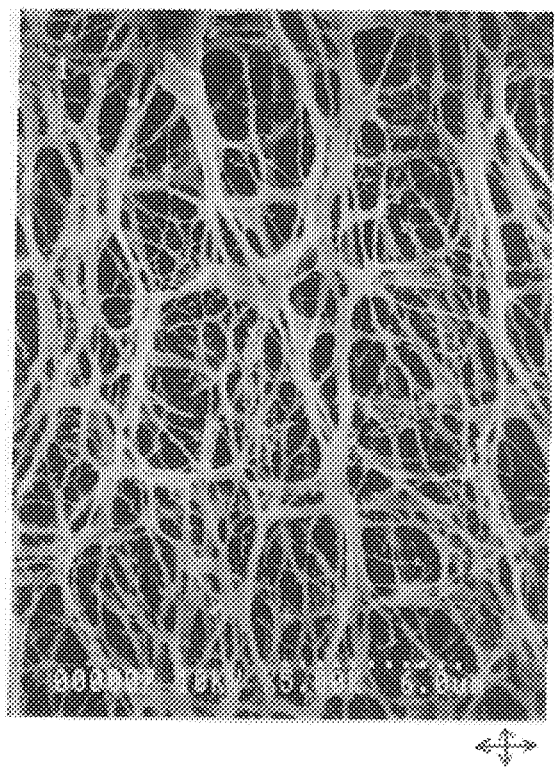
FIG. 6 is an electron microphotograph showing a film obtained by biaxial orientation of polytetrafluoroethylene (PTFE)

Referring to FIG. 5, the separator films 51 are interposed between cathodes 52 and anodes 53. FIG. 6 shows a section of a separator film obtained by forming PTFE by biaxial orientation. Referring to FIG. 6, the arrows show directions of orientation. The cathode structure of well-known foam nickel battery charged with nickel hydroxide powder, nickel powder and cobalt powder was employed for the cathode electrode of the sample battery. The anode was prepared by using a hydrogen absorbing alloy of MmNi$_{3.8}$Mn$_{0.4}$Al$_{0.3}$Co$_{0.5}$ (Mm: misch metal), mixing the alloy powder with 2% aqueous polyvinyl alcohol into a paste state, charging the paste into a porous body of a nickel foam (Cellmet (trade name) by Sumitomo Electric Industries, Ltd.) and roller-pressing the same. The anode or positive electrode prepared in the aforementioned manner and the cathode were spirally wound whereby the separator film was interposed between the anode and cathode. The spirally would-up structure was introduced into a battery jar having a diameter of 22.5 mm and a height of 49.2 mm. An electrolyte prepared by dissolving 30 g/l of lithium hydroxide in aqueous potassium hydroxide having a specific gravity of 1.20 was introduced into the battery jar, which in turn was sealed to prepare a gastight battery.

Example 2

An amount of 230 g of white oil serving as a liquid lubricant was added to 1000 g of PTFE fine powder F-104 (400 to 5,000,000 in molecular weight) by Daikin Industries, Ltd., and these materials were homogeneously mixed with each other, pressurized and preformed under a pressure of 50 kg/cm$^2$ and thereafter extruded by a paste extruder, to form by rolling a sheet having a thickness of 0.1 mm. This sheet was dipped in trichloroethylene, so that the liquid lubricant was extracted and removed. Then, the sample was drawn by 500% in a uniaxial direction (longitudinal direction) by a roll drawer which was heated to 150° C. The drawn sheet was introduced into a heating furnace such, and sintered by heating at about 500° C. for 1 minute. The film had a thickness of 40 μm, an average pore size of 5 μm, and a porosity of 40%. The film prepared in the aforementioned manner was dipped into an aqueous solution containing 0.5% of polyvinyl alcohol (Kuraray Povar PVA-217 by Kuraray Co., Ltd., with an average degree of 1750 of polymerization and 88 mole % in degree of saponification). Then, the porous film was impregnated with the aqueous polyvinyl alcohol and irradiated with an electron beam of 6 Mrad so that the polyvinyl alcohol was immobilized, thereby forming a hydrophilic resin layer. The resulting film was used as a separator for a battery. A gastight battery was prepared similarly to Example 1, except that the above film was employed as a separator film.

Example 3

A gastight battery was prepared similarly to Example 1, except that the separator was a generally employed polypropylene nonwoven fabric having a thickness of 150 μm. This fabric was dipped in fuming sulfuric acid to provide the fabric with a hydrophilicity. The electrode dimensions were reduced due to the large thickness of the separator film.

The aforementioned three types of batteries were charged at 0.5 A for 7 hours and thereafter discharged to 0.9 V at 0.5 A. This cycle was repeated five times. The capacities of Examples 1, 2 and 3 were and 2.8 Ah, 2.8 Ah, and 2.3 Ah respectively. These capacities were measured at the fifth cycle. as those of the respective batteries. Then, a quick charging and discharging cycle was repeated by charging the batteries for 1.5 hours and discharging the same to 0.9 V for a long time with currents of 2.8 A for Examples 1 and 2 and 2.3 A for Example 3, to carry out a test. Table 1 shows internal pressures in the final charging stages at the 200-th cycle.

TABLE 1

| | Internal Pressure in Charging at 200-th Cycle (kg/cm$^2$) |
|---|---|
| Example 1 | 3.3 |
| Example 2 | 4.7 |
| Example 3 | 4.4 |

It is believed that the battery according to Example 1, had the smallest internal pressure smaller than that of Examples 2 and 3 and maintained that low internal pressure by satisfactorily permeating gaseous oxygen generated in its cathode and absorbing the same in its anode through the separator film also in the quick charging and discharging cycle. As to these results, a similar tendency was attained when the anodes were replaced by those made of ordinary active materials of $Cd(OH)_2$. Comparing Example 1 with Examples 2 and 3, it is possible to implement a high capacity in a battery by a biaxially oriented porous film having an excellent permeability for gaseous oxygen generated by a cathode in a quick charging, particularly an overcharging.

Example 4

A separator film having a porosity of 80%, a pore size porosity, 0.1 μm, and a thickness of 20 μm was prepared similarly to Example 1, except that a sheet of 0.15 mm in thickness was employed. As shown in FIG. 5, such separator films 51 were combined with cathodes 52 of polyaniline and anodes 53 of a lithium-aluminum alloy and introduced into a battery jar having a diameter of 22.5 mm and a height of 49.2 mm. Propylene carbonate in which 1M lithium borofluoride was dissolved was injected into the battery jar, which in turn was sealed to prepare a gastight battery.

Example 5

A separator film was prepared similarly to Example 2, except that a sheet having a thickness of 0.05 mm was drawn, to prepare a resin porous film having a porosity of 40%, a pore size of 0.1 μm and a thickness of 20 μm. A nonaqueous electrolyte battery was prepared in a method similar to that of Example 4.

Example 6

Figure 7:
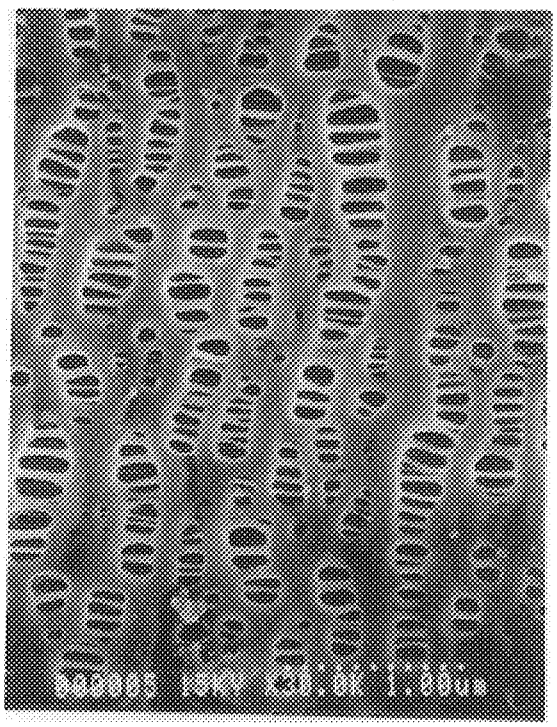
FIG. 7 is an electron microphotograph showing a film obtained by uniaxial orientation of polypropylene (PP)

A nonaqueous electrolyte battery was prepared by a method similar to that of Example 4, by using resin porous film (Duragard (trade name in Japan) or CELGARD (registered trademark in United States of America) by Hext Celanese Co.) having a porosity of 38%, a pore size of 0.05×0.125 μm, and a thickness of and 25 μm. The film was obtained by uniaxially orienting a polypropylene sheet. FIG. 7 shows the surface structure of the separator film. Referring to FIG. 7, the arrow shows the direction of orientation.

Figure 8:
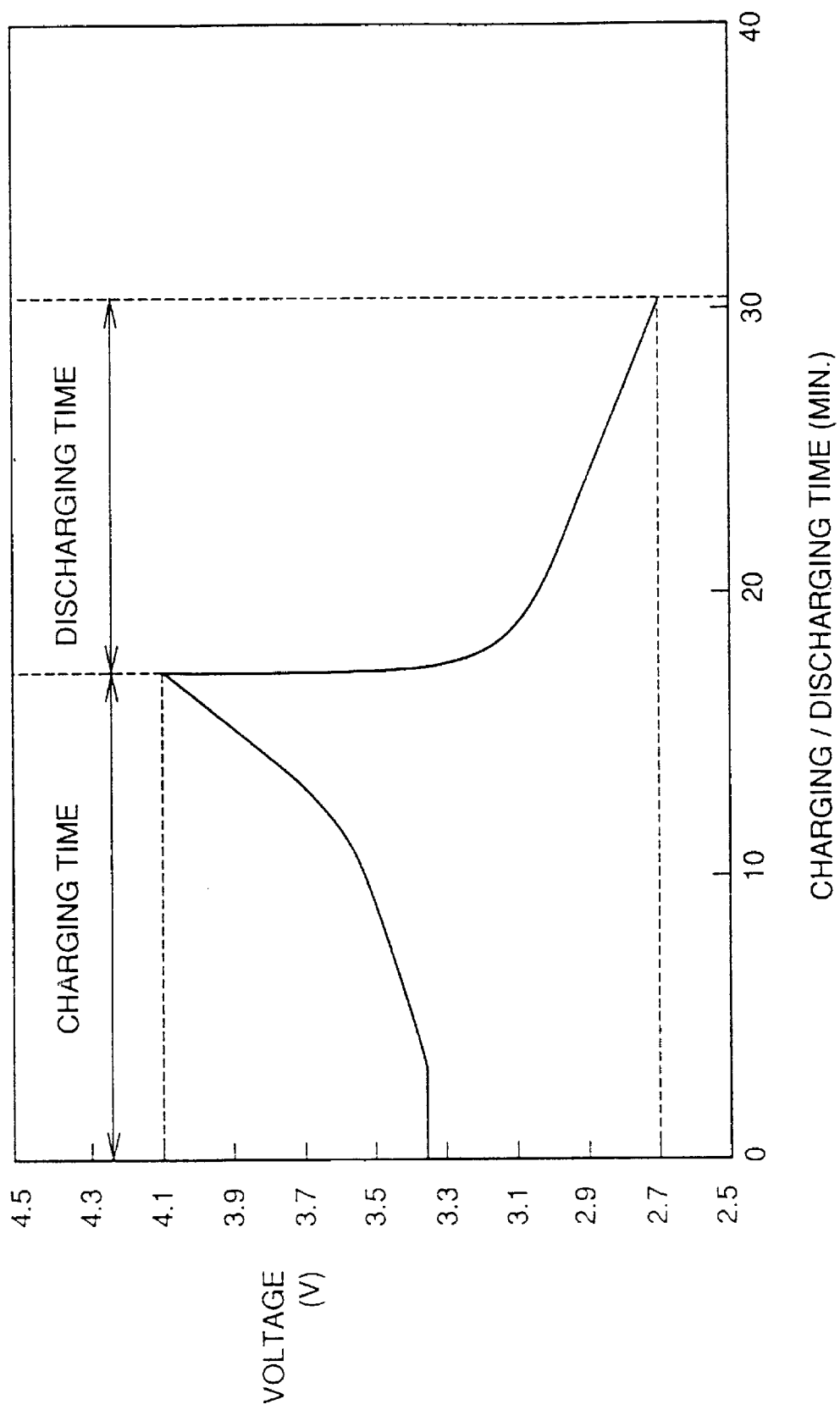
FIG. 8 illustrates the charging and discharging characteristics of a nonaqueous electrolyte battery according to Example 1.

The three types of nonaqueous electrolyte batteries obtained according to Examples 4 to 6 were subjected to the following charging and discharging experiment. First, each sample was charged at a current density of 5 $mA/cm^2$ to reach an upper limit voltage, which was set at 4.1 V. Then, each sample was discharged at a current density of 5 $mA/cm^2$ to reach a lower limit voltage, which was set at 2.7 V. Thereafter, each sample was again charged in a similar manner. Thus, charging and discharging were repeated. FIG. 8 shows quick charging and discharging characteristics of Example 4. Referring to FIG. 8, the abscissa shows the charging and discharging time (min.), and the ordinate shows the battery voltage (V). Quick charging and discharging characteristics of the batteries were evaluated in the 20th charging and discharging cycle. Table 2 shows the results.

TABLE 2

|  | Charging Time (min.) | Discharging Time (min.) |
| --- | --- | --- |
| Example 4 | 11.9 | 11.8 |
| Example 5 | 9.1 | 9.0 |
| Example 6 | 8.9 | 8.8 |

It is understood from Table 2 that Example 4 has the longest charging and discharging time and the highest capacity. As to the quick charging and discharging characteristics, similar tendency was attained in nonaqueous batteries having cathodes of $LiCoO_2$, anodes of carbon, electrolytes of a material prepared by dissolving $LiPF_6$ in a mixed solvent of 1,2-dimethoxyethane with ethylene carbonate, and separator films of Examples 4 to 6 respectively. Comparing Example 4 with Examples 5 and 6, it is understood that a biaxial oriented porous film is superior in quick charging/discharging characteristics.

Example 7

The drawing speed in Example 1 was varied to obtain hydrophilized resin porous films having a porosity, and a thickness of 80% 20 μm, for pore sizes of 0.05 μm, 0.1 μm, 0.2 μm, 0.45 μm, 1 μm, 3 μm and 5 μm, respectively. Gastight batteries were formed by the respective separator films similarly to Example 4.

Example 8

The drawing speed was varied to obtain hydrophilized resin porous films having a porosity of 40% and a thickness of 20 μm for pore sizes of 0.05 μm, 0.1 μm, 0.2 μm, 0.45 μm, 1 μm, 3 μm and 5 μm, respectively. The method of Example 2 was used also for Example 8. Batteries were assembled with the respective separator films under conditions similar to those of Example 4.

Nonaqueous electrolyte batteries obtained in Examples 7 and 8 were subjected to a quick charging and discharging test, similarly to Example 4. Table 3 shows the results.

TABLE 3

| | Example 7 | | Example 8 | |
| --- | --- | --- | --- | --- |
| Pore Size | Charging Time (min.) | Discharging Time (min.) | Charging Time (min.) | Discharging Time (min.) |
| 0.05 | 10.2 | 10.1 | 4.4 | 4.3 |
| 0.1 | 11.9 | 11.8 | 5.9 | 5.8 |
| 0.2 | 13.1 | 13.0 | 6.4 | 6.3 |
| 0.45 | 17.9 | 17.8 | 8.3 | 8.2 |
| 1.0 | 18.4 | 18.2 | 9.1 | 9.0 |
| 3.0 | 18.5 | 18.3 | 9.0 | 8.9 |
| 5.0 | 18.4 | 18.2 | 9.1 | 9.0 |

As shown in Table 3, it is possible to provide a battery with a biaxially oriented film (Example 7) to achieve superior quick charging and discharging characteristics as compared to a battery having a uniaxial oriented separator film (Example 8). This tendency is remarkable particularly in a range of pore sizes exceeding 0.45 μm.

Figure 9:
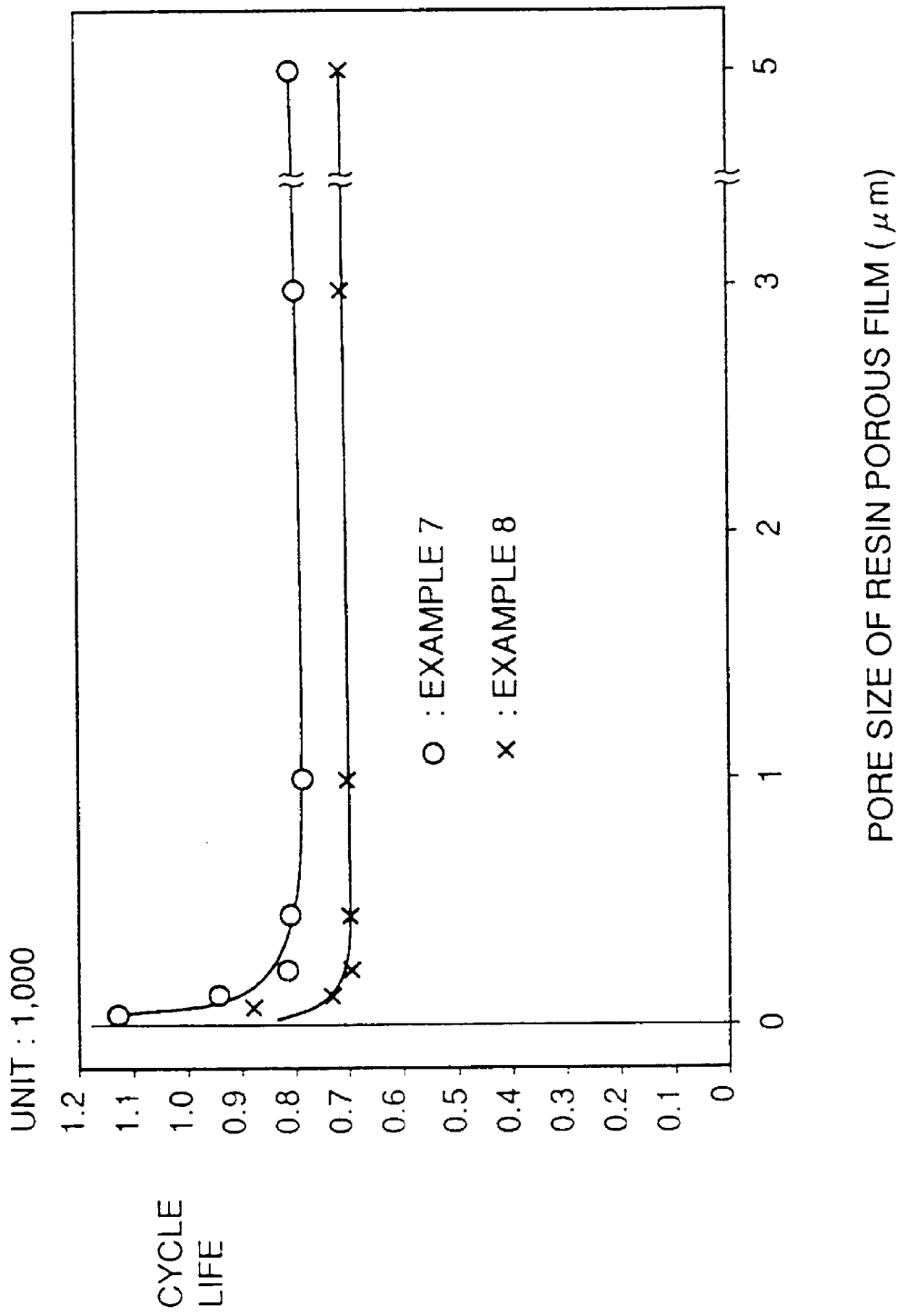
FIG. 9 is a graph showing cycle life as a function of pore sizes in two different resin porous films.

The nonaqueous electrolyte batteries obtained in Examples 7 and 8 were further subjected to the following charging and discharging cycle test: Each battery was charged for 30 minutes under a condition of a charging and discharging current density of 1 $MA/cm^2$, and thereafter discharged toward a lower limit voltage of 2.7 V. This cycle was repeated. The life of each battery was decided when the charging voltage reached 4.1 V to disable charging for 30 minutes. FIG. 9 shows the results. A longer life was attained with a biaxially oriented porous film having a higher porosity with smaller pore sizes, as compared with the uniaxially oriented film. It is understood that the cycle life is abruptly improved in a pore size range of not more than 0.2 μm in particular. This improvement due to smaller pore sizes is believed to be due to preventing internal short circuits by deposited lithium with the reduction in pore size.

Example 9

A sheet of Poreflon (trade name: PTFE oriented film by Sumitomo Electric Industries, Ltd.) having a porosity of 80%, an average pore size of 10 μm and a thickness of 100 μm was dipped in an aqueous solution containing 0.5% of polyvinyl alcohol (Kuraray Povar PVA-217 by Kuraray Co., Ltd., an average degree of 1750 of polymerization and 88 mole % as a degree of saponification). Then, the porous film impregnated with the aqueous polyvinyl alcohol was irradiated with an electron beam of 6 Mrad so that the polyvinyl alcohol immobilized, thereby forming a hydrophilic resin layer. The obtained film was employed as a separator film for a battery. A well-known foam nickel electrode charged with nickel hydroxide powder, nickel powder and cobalt powder was employed as the cathode of the battery. The anode was prepared by employing a hydrogen absorbing alloy of $MmNi_{3.8}Mn_{0.4}Al_{0.3}Co_{0.5}$ (Mm: misch metal), mixing the alloy powder with 2% aqueous polyvinyl alcohol into a paste state, charging the paste in the porous body of the nickel foam (Cellmet (trade name) by Sumitomo Electric Industries, Ltd.) and roller-pressing the same. The cathode and anode prepared in the aforementioned manner were spirally wound with interposition of the separator film therebetween, and introduced into a battery jar having a diameter of 22.5 mm and a height of 49.2 mm. An electrolyte prepared by dissolving 30 g/l of lithium hydroxide in aqueous potassium hydroxide having a specific gravity of 1.20 was introduced into the battery jar, which in turn was sealed to prepare a gastight battery.

Example 10

A sheet of Poreflon (trade name by Sumitomo Electric Industries, Ltd.) having a porosity of 80%, an average pore size of 10 μm and a thickness of 100 μm was dipped in a 7% solution prepared by diluting commercially available 30% aqueous polyethylene imine with isopropyl alcohol for 10 minutes, air-dried and thereafter dipped in 5% aqueous glyoxal for 1 minute to be cross-linked, thereby forming a hydrophilic resin film. This film was then rinsed to be employed as a separator film. A gastight battery was prepared similarly to Example 9, except that this separator film was employed.

Example 11

An ethylene or vinyl alcohol random copolymer (Eval (trade name) by Kuraray Co., Ltd.) was dissolved in a solution containing isopropyl alcohol and water in a ratio of 7:1, and the same Poreflon film as that employed in Example 9 was dipped in this solution. Thereafter the film was raised up and dipped in water, so that a hydrophilic resin layer made of the copolymer was formed in the film. The so obtained film was employed as a separator film, to prepare a gastight battery similarly to Example 9.

Example 12

A hydrophilic polymer layer was formed similarly to Example 9 except that the Poreflon film was replaced by polyethylene nonwoven fabric. A gastight battery was prepared from the obtained separator film, similarly to Example 9.

Example 13

A Poreflon film was impregnated with aqueous polyvinyl alcohol, similarly to Example 9. Then, lead rods of 0.5 mm wide were arranged at intervals of 10 mm, and the film was irradiated with an electron beam of 6 Mrad through the lead rods. Fixation of the polyvinyl alcohol as impregnated progressed in portions of the film irradiated with the electron beam, while such fixation was suppressed in portions shielded against the irradiation by the lead rods. Thus, it was possible to leave hydrophobic portions in the unirradiated portions. The separator film thus obtained was employed to prepare a gastight battery similarly to Example 9.

Example 14

One surface of a separator film which was prepared similarly to Example 11 was wiped with fabric containing isopropyl alcohol, to make the treated or wiped surface hydrophobic. This film was dipped in water containing a surface active agent and thereafter dried to be employed as a separator film, for preparing a gastight battery similarly to Example 9.

Example 15

A Poreflon film of 50 μm in thickness was hydrophilized similarly to Example 9. The resulting film was superposed with another Poreflon film having a thickness of 50 μm and which was coated with a surface active agent, to prepare a separator film. This separator film was employed to prepare a gastight battery similarly to Example 9.

Example 16

Two Poreflon films of 25 μm in thickness were hydrophilized respectively, similarly to Example 9. The obtained two films were used to hold sulfonized polypropylene nonwoven fabric having a porosity of: 60% and a thickness of 50 μm to obtain a laminated separator film. which was employed to prepare a gastight battery similarly to Example 9.

Example 17

A Poreflon film having a thickness of 25 μm was hydrophilized similarly to Example 9. The resulting film was stacked with sulfonized polypropylene nonwoven fabric porosity: 60% having a thickness of 75 μm, to obtain a laminated separator film which was employed to prepare a gastight battery similarly to Example 9.

Example 18

A gastight battery was prepared similarly to Example 9, except that generally used polypropylene nonwoven fabric dipped in fuming sulfuric acid was employed as a separator film.

Example 19

A sheet of Poreflon (trade name by Sumitomo Electric Industries, Ltd.) having a porosity of 80%, an average pore size 10 μm and a thickness of and 100 μm was hydrophilized by a plasma treatment in nitrogen at a pressure of 0.5 Torr. The discharging power of plasma treatment was 10 W. The resulting film was employed as a separator film in a gastight battery prepared similarly to Example 9.

The eleven different batteries according to Examples 9 to 19 were subjected to a cycle test of charging the same at 0.5 A for 7 hours and thereafter discharging the same to 0.9 V at 0.5 A. All batteries exhibited capacities of 2.5 Ah at the fifth cycle, which were taken as capacities of the respective batteries. Then, the 11 batteries were subjected to a test of repeating a quick charging and discharging cycle wherein charging took place at 2.5 A for 1.5 hours and discharging took place to 0.9 V at 2.5 A for a long time. Table 4 shows the results indicating that the batteries of Examples 9 to 17 according to the invention have long lives and permeate gaseous oxygen through the separators also in the quick charging and discharging cycle, for maintaining low internal pressures. It is also understood that gas permeation is facilitated by the portions having hydrophobicity or low hydrophilicity provided in the separators, thereby suppressing internal pressures of the batteries of the invention. Examples 18 and 19 show substantially inferior results.

TABLE 4

|  | Number of Cycles Reducing Capacity to 60% | Internal Pressure in Final Stage of Charging in 200 cycles (kg/cm$^2$) |
|---|---|---|
| Example 9 | at least 500 | 3.3 |
| Example 10 | at least 500 | 3.5 |
| Example 11 | at least 500 | 3.5 |
| Example 12 | at least 500 | 3.7 |
| Example 13 | at least 500 | 2.7 |
| Example 14 | at least 500 | 2.4 |
| Example 15 | at least 500 | 2.3 |
| Example 16 | at least 500 | 3.3 |
| Example 17 | at least 500 | 3.2 |
| Example 18 | 234 | 4.4 |
| Example 19 | 400 | 3.8 |

Example 20

Figure 10:
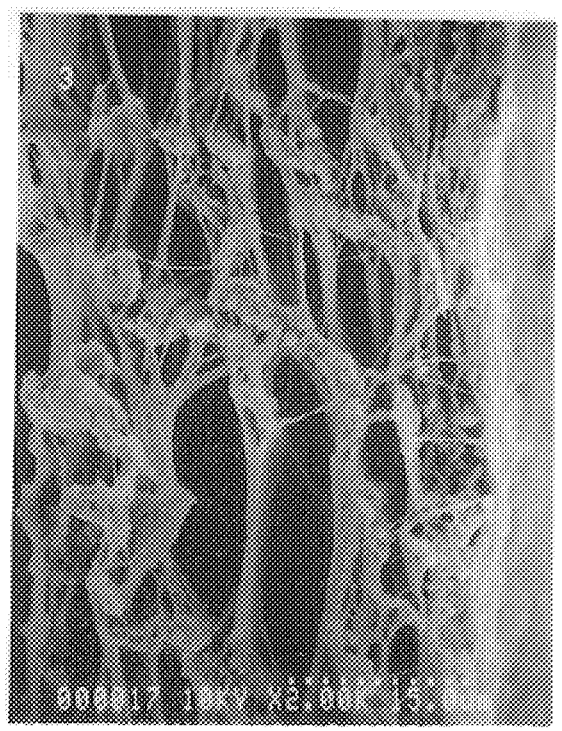
FIG. 10 is an electron microphotograph showing a porous structure in a section of a film obtained in each of Examples 20 and 22.

An amount of 230 g of white oil serving as a liquid lubricant was added to 1000 g of PTFE fine powder F-104 (400 to 5,000,000 in molecular weight) by Daikin Industries, Ltd., and these materials were homogeneously mixed with each other, pressurized and preformed under a pressure of 50 kg/cm$^2$. Thereafter the mixture was extruded by a paste extruder having a cylinder diameter of 130 mm. The extruded paste was rolled into a sheet having a thickness of 0.3 mm. This sheet was dipped in trichloroethylene, so that the liquid lubricant was extracted and removed. Then, the sample was drawn by 500% in a uniaxial direction (longitudinal direction) and by 500% in the direction of width by a roll drawer which was heated to 150° C. The drawn sheet was introduced into a heating furnace, and sintered by heating at about 500° C. for 1 minute. The resulting film had a pore size of 10 μm in the vicinity of its surface and a pore size of 80 μm in its central portion. The porosity of the film taken as a whole was 85%. FIG. 10 shows a micrograph of a section through the film taken as a whole. As shown in FIG. 10, the surface portion has small pores, while the interior has very large pores. The film had a thickness of 100 μm and was dipped into an aqueous solution containing 0.5% of polyvinyl alcohol Kuraray Povar PVA-217 by Kuraray Co., Ltd., having an average degree of 1750 of polymerization and 88 mole % as a degree of saponification. Then, the porous film impregnated with the aqueous polyvinyl alcohol was irradiated with an electron beam of 6 Mrad so that the polyvinyl alcohol was immobilized, thereby forming a hydrophilic resin layer. The resulting film was employed as a separator film in a battery. A well-known nickel foam electrode charged with nickel hydroxide powder, nickel powder and cobalt powder was employed as the cathode of the battery. The anode was prepared by employing a hydrogen absorbing alloy of MmNi$_{3.8}$Mn$_{0.4}$Al$_{0.3}$Co$_{0.5}$ (Mm: misch metal), mixing the alloy powder with 2% aqueous polyvinyl alcohol into a paste, charging the paste into the porous body of the nickel foam (Cellmet (trade name) by Sumitomo Electric Industries, Ltd.) and roller-pressing the same. The cathode and anode prepared in the aforementioned manner were spirally wound with the separator film interposed between the anode and cathode to form a wound structure that was introduced into a battery jar having a diameter of 22.5 mm and a height of 49.2 mm. An electrolyte prepared by dissolving 30 g/l of lithium hydroxide in aqueous potassium hydroxide having a specific gravity of 1.20 was introduced into the battery jar, which in turn was sealed to prepare a gastight battery.

Example 21

Polytetrafluoroethylene (PTFE) was extruded and drawn similarly to Example 20, except that the cylinder diameter of the extruder was changed to 90 mmφ. Thereafter the resulting film was compressed by a heating roller at 400° C. to sinter the film. The surface which was in contact with the roller had a pore size of 10 μm, while the opposite surface had a pore size of 50 μm. The film had a porosity of 85%. The porous film had a thickness of 100 μm and was provided with a hydrophilic resin layer, similarly to Example 20. This film was employed as a separator film and spirally wound so that the surface having a pore size of 50 μm was in contact with a cathode, thereby preparing a gastight battery similarly to Example 20.

Example 22

An amount of 230 g of white oil serving as a liquid lubricant was added to 1000 g of PTFE fine powder F-104 (400 to 5,000,000 in molecular weight) by Daikin Industries, Ltd., and these materials were homogeneously mixed with each other, pressurized and preformed under a pressure of 50 kg/cm$^2$. Thereafter the mixture was extruded by a paste extruder having a cylinder diameter of 130 mm into a sheet having a thickness of 0.3 mm. This sheet was dipped in trichloroethylene, so that the liquid lubricant was extracted and removed. Then, the sample was drawn by 500% in a uniaxial direction (longitudinal direction) and by 500% in the direction of width by a roll drawer which was heated to 150° C. The drawn sheet was introduced into a heating furnace, and sintered by heating at about 500° C. for 1 minute. The resulting film had a pore size 10 μm in the vicinity of its surface a pore size of 80 μm in its central portion. The porosity of the film was 85%. FIG. 10 shows a micrograph of a section through the film. As shown in FIG. 10, the film has small pores in its surface layer while the interior has very large pores. The film had a thickness of 100 μm and was dipped into an aqueous solution containing 0.5% of polyvinyl alcohol (Kuraray Povar PVA-217 by Kuraray Co., Ltd., having an average degree of 1750 of polymerization and 88 mole % as a degree of saponification). Then, lead wires having a width of 1 mm were set at intervals of 10 mm on the porous film impregnated with aqueous polyvinyl alcohol, and the film was irradiated with an electron beam of 6 Mrad, so that the polyvinyl alcohol was partially immobilized outside the lead wires. The film was then rinsed to extract and remove the polyvinyl alcohol adhering to portions not immobilized namely portions shielded against the electron beam by the lead wires. Thus, hydrophilic resin was partially formed. The film was employed as a separator film in a battery, similarly to Example 20.

Example 23

An amount 230 g of white oil serving as a liquid lubricant was added to 1000 g of PTFE fine powder F-104 (400 to 5,000,000 in molecular weight) by Daikin Industries, Ltd., and these materials were homogeneously mixed with each other, and pressurized and preformed under a pressure of 50 kg/cm². Thereafter the mixture was extruded by a paste extruder having a cylinder diameter of 130 mm, and rolled into a sheet having a thickness of 0.3 mm. This sheet was dipped in trichloroethylene whereby the liquid lubricant was extracted and removed. Then, a sample was drawn by 500% in a uniaxial direction (longitudinal direction) and by 500% in a direction of width by a roll drawer which was heated to 150° C. The drawn sheet was introduced into a heating furnace, and sintered by heating at about 500° C. for 1 minute. In the film thus prepared, the pore size in the vicinity of its surface was 10 μm, the pore size in its center was 80 μm, and the film had a porosity of 85%. The thickness of the film was 100 μm. This film was dipped in a water-propyl alcohol mixed solution (water:propyl alcohol=3:7) containing 1 percent by weight of a random copolymer of ethylene and vinyl alcohol (Kuraray Eval EP-F101 (by Kuraray Co., Ltd., a 32% ethylene copolymerization ratio and a melting point at 183° C.). The film as dipped was dried at room temperature, to form a hydrophilic resin film which was employed as a separator film, to prepare a gastight battery similarly to Example 20.

Example 24

A hydrophilic porous film prepared similarly to Example 23 was dipped in fuming sulfuric acid having a concentration of 25% concentration at a temperature of 30° C. for about 15 minutes, rinsed and dried, whereby an ethylene-vinyl alcohol copolymer portion was sulfonized. The film was employed as a separator film in a battery, similarly to Example 20.

Example 25

Figure 11:
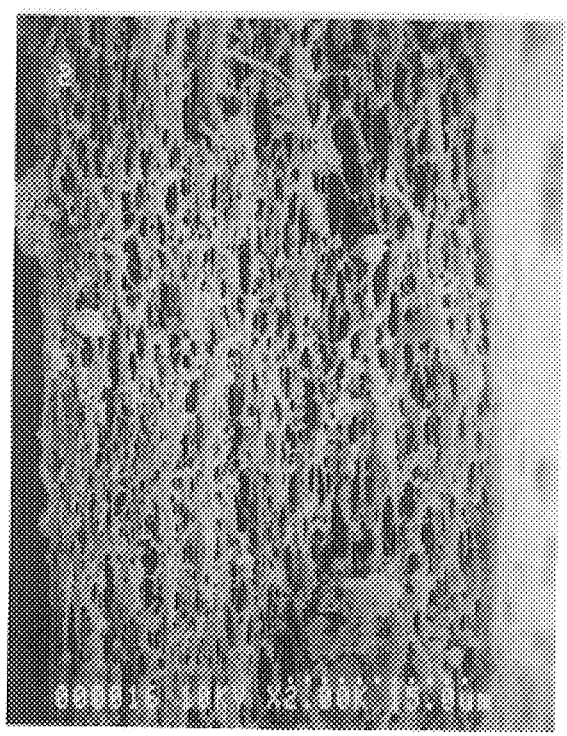
FIG. 11 is an electron microphotograph showing a porous structure in a section of a film obtained in Example 25.

Polytetrafluoroethylene (PTFE) was extruded by an extruder having a cylinder diameter of 90 mm similarly to the prior art, to form a sheet. The sheet was drawn at a smaller drawing rate than Example 20, introduced into a heating furnace and sintered, to obtain a film with a pore size that hardly changed in the direction of film thickness. This film had a pore size of about 10 μm and a porosity of 82%. FIG. 11 shows a micrograph of a section through the film. As shown in FIG. 11, the film has a substantially homogeneous porous structure. The film was hydrophilized similarly to Example 20, to prepare a gastight battery.

When the cylinder diameter of the extruder is made larger than the conventional cylinder diameter as in Example 20 a strong shearing force is applied to the surface of the extruded sheet so that resin particles are sufficiently bonded to each other and resin density is increased. Thus, the pore size is reduced in the vicinity of the surface by the drawing. Since the pore size is reduced by sintering, it is possible to obtain a film whose pore size is gradually increased from one surface toward the other surface by sintering only one side of the film as in Example 21.

The six types of batteries according to Examples 20 to 25 were subjected to a cycle of charging at 0.5 A for 7 hours and discharging at 0.5 A down to 0.9 V five times. Discharging capacities at the fifth cycle were 2.5 Ah in all batteries. Then, the batteries were subjected to an experiment of repeating a quick charging and discharging cycle by charging the batteries at 2.5 A for 1.5 hours and discharging at 2.5 A down to 0.9 V for a long time. Table 5 shows the results indicating that the batteries according to Examples 20 to 24 have particularly long lives and permeate gaseous oxygen sufficiently the separator films also in the quick charging and discharging cycle, to maintain low internal pressures.

TABLE 5

| | Number of Cycles Reducing Capacity to 60% | Internal Pressure in Final Stage of Charging in 200 Cycles |
| --- | --- | --- |
| Example 20 | at least 700 | 2.8 |
| Example 21 | at least 700 | 2.5 |
| Example 22 | at least 700 | 2.2 |
| Example 23 | at least 700 | 3.0 |
| Example 24 | at least 700 | 2.8 |
| Example 25 | 550 | 3.3 |

Table 5 shows that the porosity of the separator film has a noticeable influence on the pressure build-up inside the battery when testing the discharging capacities. Examples 20 to 24 have a porosity of 85% in a single film. Example 25 has a porosity of 82% and reaches its 60% capacity already at 550 testing cycles. Contrary thereto, Examples 20 to 24 reach the 60% capacity level only agter at least 700 testing cycles.

The effect of a varying porosity on the gas permeability can also be attained by stacking films having different pososities.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A separator film for interposition between an anode and a cathode of a storage battery, comprising a porous oriented film consisting essentially of hydrophobic resin having pores therein, and one or more hydrophilic polymers fixed to said hydrophobic resin of said porous oriented film, a heterogeneous distribution of said hydrophilic polymer or polymers in or on said porous oriented film, said heterogeneous distribution forming in said porous oriented film a first film portion and a second film portion, said first film portion formed by said heterogeneous distribution having a first hydrophilicity caused by said hydrophilic polymer or polymers, said second film portion formed by said heterogeneous distribution containing a smaller amount of said hydrophilic polymer or polymers than said first film portion or no hydrophilic polymer, whereby said second film portion has a second hydrophilicity that is lower than said first hydrophilicity of said first film portion or a hydrophobicity caused by said hydrophobic resin, and wherein said porous oriented film has a gas permeability.

2. The separator film of claim 1, wherein said hydrophobic resin is fluororesin.

3. The separator film of claim 1, wherein said porous oriented film is a biaxially oriented film.

4. The separator film of claim 1, wherein said second film portion is provided in the form of spots or stripes in said porous oriented film.

5. The separator film of claim 1, wherein said second film portion is formed along one major surface of a pair of opposite major surfaces of said porous oriented film.

6. The separator film of claim 1, wherein said porous oriented film comprises a stack of superposed separate film plies including a first film ply having a hydrophilicity and a second film ply having one of a hydrophobicity and a hydrophilicity lower than that of said first film ply.

7. The separator film of claim 1, wherein said porous oriented film has a porosity of at least about 70%, a thickness in a range of about 10 to about 500 μm, and a pore size in a range of about 0.01 to about 20 μm.

8. The separator film of claim 1, wherein said hydrophilic polymer comprises one or more polymers selected from the group consisting of a polymer containing hydroxyl groups, a polymer containing carboxyl groups, a polymer containing imine, and a polymer containing sulfonic acid groups.

9. A separator film for interposition between an anode and a cathode of a storage battery, consisting essentially of a single porous oriented film consisting essentially of hydrophobic resin having pores therein, and one or more hydrophilic polymers fixed to said porous oriented film, wherein said pores of said porous oriented film comprises pore sizes that vary in the thickness direction of said porous oriented film, and wherein said porous oriented film has a gas permeability.

10. The separator film of claim 9, wherein said hydrophobic resin is fluororesin.

11. The separator film of claim 9, wherein said porous oriented film is a biaxially oriented film.

12. The separator film of claim 1, wherein a portion of said porous oriented film positioned next to at least one major surface of a pair of major surfaces of said porous oriented film comprises pores having a smaller pore size than pores in an interior portion of said porous oriented film.

13. The separator film of claim 12, wherein said pore size is gradually reduced from one major surface toward the other major surface.

14. The separator film of claim 12, wherein said interior portion comprises pores of larger pore size than the pore size in film portions along both major surfaces.

15. The separator film of claim 9, further comprising a heterogeneous distribution of said hydrophilic polymer or polymers in said porous oriented film, said heterogeneous distribution forming in said porous oriented film a first film portion having a first hydrophilicity caused by said hydrophilic polymer or polymers and a second film portion having one of a hydrophobicity and a second hydrophilicity that is lower than said first hydrophilicity of said first film portion.

16. The separator film of claim 9, wherein said porous oriented film has a porosity of at least about 70%, a thickness in a range of about 10 to 500 μm, and a pore size in a range of about 0.01 to about 20 μm.

17. The separator film of claim 9, wherein said hydrophilic polymer or polymers comprise one or more polymers selected from the group consisting of a polymer containing hydroxyl groups, a polymer containing carboxyl groups, a polymer containing imine, and a polymer containing sulfonic acid groups.

18. A separator film for interposition between an anode and a cathode of a storage battery, consisting essentially of a single porous resin film consisting essentially of hydrophilized hydrophobic resin and pores in said porous resin film, said porous resin film having porosities that vary in the thickness direction of said porous resin film, and wherein said porous resin film has a gas permeability.

19. The separator film of claim 18, wherein said hydrophobic resin is fluororesin and/or polyolefin resin.

20. The separator film of claim 18, wherein said hydrophobic resin is an oriented film.

21. The separator film of claim 20, wherein said hydrophobic resin is a biaxially oriented film.

22. The separator film of claim 18, wherein said porous resin film comprises a porous film consisting essentially of hydrophobic resin, and one or more hydrophilic polymers fixed to said porous resin film.

23. The separator film of claim 22, further comprising a heterogeneous distribution of said hydrophilic polymer in or on said porous resin film, said porous resin film further comprising a first film portion having a first hydrophilicity caused by said hydrophilic polymer or polymers and a second film portion having one of a hydrophobicity and a second hydrophilicity that is lower than said first hydrophilicity of said first film portion.

24. The separator film of claim 22, wherein said porous resin film has a porosity of at least about 70%, a thickness in a range of about 10 to about 500 μm, and a pore size in a range of about 0.01 to about 20 μm.

25. The separator film of claim 22, wherein said hydrophilic polymer or polymers comprises one or more polymers selected from the group consisting of a polymer containing hydroxyl groups, a polymer containing carboxyl groups, a polymer containing imine, and a polymer containing sulfonic acid groups.

26. The separator film of claim 18, wherein said porous resin film comprises a plurality of film plies having different porosities, said film plies forming a stack.

27. The separator film of claim 18, wherein said porous resin film comprises a porous, oriented fluororesin film hydrophilized by one or more hydrophilic polymers fixed to said porous oriented fluororesin film, and a hydrophilized porous polyolefin resin film superimposed on said porous oriented fluororesin film, and wherein each of said porous oriented fluororesin film and said polyolefin resin film has a different porosity.

* * * * *

UNITED STATES PATENT AND TRADEMARK OFFICE
CERTIFICATE OF CORRECTION

PATENT NO. : 5,830,603
DATED : Nov. 3, 1998
INVENTOR(S) : Oka et al.

It is certified that error appears in the above-identified patent and that said Letters Patent is hereby corrected as shown below:

Col. 1, line 15, after "and" (second occurrence) delete "a";

line 54, after "prevent" insert --a--.

Col. 2, line 5, after "a" delete "with".

Col. 5, line 21, after "of" delete "the".

Col. 6, line 35, after "withstand" replace "by" by --a--;

line 66, after "whereby" insert --a film--.

Col. 7, line 15, after "short-circuit", replace "," by --. Futher,--;
line 17, after "and" replace "further" by --most--;
line 58, after "may" delete "be", after "further" insert --be--.

Col. 8, line 12, after "porous" replace "film. Suffi-" by --film suffi- --.

Col. 9, line 6, after "the" replace "marking" by --masking--;
line 11, after "21" delete "surface";
line 31, after "film" (second occurrence) replace "ply" by --plies--;
line 66, after "the" delete "entire".

UNITED STATES PATENT AND TRADEMARK OFFICE
CERTIFICATE OF CORRECTION

PATENT NO. : 5,830,603
DATED : Nov. 3, 1998
INVENTOR(S) : Oka et al.

It is certified that error appears in the above-identified patent and that said Letters Patent is hereby corrected as shown below:

Col. 11, line 33, after "to" insert --attain--;
line 64, after "for" insert --facilitating--.

Col. 12, line 2, after "the" replace "causing" by --portion--.

Col. 13, line 25, after "size" replace "distribution" by --distributions--;
line 33, after "sheet" delete "of";
line 57, after "of" (second occurrence) insert --a--.

Col. 14, line 3, after "spirally" replace "would-up" by --wound-up--;
line 49, after "cycle." delete "as those of the respective batteries.".

line 56, after "1" replace "MA/cm$^2$" by --mA/cm$^2$--.

Col. 19, line 48, after "film" replace "taken as a" by --.--;
line 49, before "As" delete "whole.".

Col. 20, line 35, after "mm" insert --and rolled--;
line 44, after "surface" insert --and--.

UNITED STATES PATENT AND TRADEMARK OFFICE
CERTIFICATE OF CORRECTION

PATENT NO. : 5,830,603
DATED : Nov. 3, 1998
INVENTOR(S) : Oka et al.

It is certified that error appears in the above-identified patent and that said Letters Patent is hereby corrected as shown below:

Col. 21, line 29, after "25%" delete "concentration".

Col. 22, line 1, after "ciently" insert --through--;
line 21, after "only" replace "agter" by --after--.

Col. 23, line 21, after "claim" replace "1" by --9--.

Signed and Sealed this

Twentieth Day of April, 1999

Q. TODD DICKINSON

*Attest:*

*Attesting Officer*     Acting Commissioner of Patents and Trademarks

UNITED STATES PATENT AND TRADEMARK OFFICE
CERTIFICATE OF CORRECTION

PATENT : 5,830,603

DATED : Nov. 3, 1998

INVENTOR(S) : Oka et al

It is certified that error appears in the above-identified patent and that said Letters Patent is hereby corrected as shown below:

Col. 1, line 15, after "and" (second occurrence) delete "a";

line 54, after "prevent" insert --a--.

Col. 2, line 5, after "a" delete "with".

Col. 5, line 21, after "of" delete "the".

Col. 6, line 35, after "withstand" replace "by" by --a--;

line 66, after "whereby" insert --a film--.

Col. 7, line 15, after "short-circuit", replace "," by --. Futher,--;
line 17, after "and" replace "further" by --most--;
line 58, after "may" delete "be", after "further" insert --be--.

Col. 8, line 12, after "porous" replace "film. Suffi-" by --film suffi- --.

Col. 9, line 6, after "the" replace "marking" by --masking--;
line 11, after "21" delete "surface";
line 31, after "film" (second occurrence) replace "ply" by --plies--;
line 66, after "the" delete "entire".

UNITED STATES PATENT AND TRADEMARK OFFICE
CERTIFICATE OF CORRECTION

PATENT : 5,830,603

DATED : Nov. 3, 1998

INVENTOR(S) : Oka et al

It is certified that error appears in the above-identified patent and that said Letters Patent is hereby corrected as shown below:

Col. 11, line 33, after "to" insert --attain--;
line 64, after "for" insert --facilitating--.

Col. 12, line 2, after "the" replace "causing" by --portion--.

Col. 13, line 25, after "size" replace "distribution" by --distributions--;
line 33, after "sheet" delete "of";
line 57, after "of" (second occurrence) insert --a--.

Col. 14, line 3, after "spirally" replace "would-up" by --wound-up--;
line 49, after "cycle." delete "as those of the respective batteries.".

Col. 16, line 56, after "1" replace "MA/cm$^2$" by --mA/cm$^2$--.

Col. 19, line 48, after "film" replace "taken as a" by --.--;
line 49, before "As" delete "whole.".

Col. 20, line 35, after "mm" insert --and rolled--;
line 44, after "surface" insert --and--.

UNITED STATES PATENT AND TRADEMARK OFFICE
CERTIFICATE OF CORRECTION

PATENT : 5,830,603
DATED : Nov. 3, 1998
INVENTOR(S) : Oka et al

It is certified that error appears in the above-identified patent and that said Letters Patent is hereby corrected as shown below:

Col. 21, line 29, after "25%" delete "concentration".

Col. 22, line 1, after "ciently" insert --through--;
line 21, after "only" replace "agter" by --after--.

Col. 23, line 21, after "claim" replace "1" by --9--.

This certificate supersedes Certificate of Correction issued April 20, 1999.

Signed and Sealed this

Ninth Day of May, 2000

Attest:

Q. TODD DICKINSON

Attesting Officer

Director of Patents and Trademarks